US012689839B2

(12) United States Patent
Choi et al.

(10) Patent No.: US 12,689,839 B2
(45) Date of Patent: Jul. 21, 2026

(54) LENS SHADING CORRECTION CIRCUIT, LENS SHADING CORRECTION METHOD, AND IMAGE PROCESSING SYSTEM

(71) Applicant: SAMSUNG ELECTRONICS CO., LTD., Suwon-si (KR)

(72) Inventors: Changhoon Choi, Suwon-si (KR); Seungwon Choi, Suwon-si (KR); Hyuncheol Kim, Suwon-si (KR); Jongseong Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 244 days.

(21) Appl. No.: 18/399,340

(22) Filed: Dec. 28, 2023

(65) Prior Publication Data

US 2024/0259707 A1 Aug. 1, 2024

(30) Foreign Application Priority Data

Jan. 30, 2023 (KR) ........................ 10-2023-0011861

(51) Int. Cl.
H04N 25/61 (2023.01)
H04N 23/71 (2023.01)
(Continued)

(52) U.S. Cl.
CPC ............. *H04N 25/61* (2023.01); *H04N 23/71* (2023.01); *H04N 23/72* (2023.01); *H04N 23/75* (2023.01); *H04N 23/76* (2023.01); *H04N 25/51* (2023.01)

(58) Field of Classification Search
CPC ........ H04N 25/61; H04N 23/71; H04N 23/72; H04N 23/75; H04N 23/76; H04N 25/51;
(Continued)

(56) References Cited

U.S. PATENT DOCUMENTS 4,482,975 A * 11/1984 King ...................... G06F 7/535
708/9
7,391,450 B2 6/2008 Pinto et al.
(Continued)

FOREIGN PATENT DOCUMENTS

EP 2887308 6/2015
KR 10-2006-0022989 A 3/2006
KR 10-0860699 9/2008

OTHER PUBLICATIONS

De Silva, et al., "A novel adaptive shading correction algorithm for camera systems", Loughborough University Institutional Repository, Society for Imaging Science and Technology, 2016, found on the internet at https://dspace.lboro.ac.uk/2134/24089, DOI: 10.2352/ISSN.2470-1173.2016.18.DPMI-249, 6 pages.
(Continued)

*Primary Examiner* — Timothy J Henn
(74) *Attorney, Agent, or Firm* — Morgan, Lewis & Bockius LLP

(57) ABSTRACT
A lens shading correction circuit includes an elliptical gain generation circuit configured to extract a position of a pixel and generate an elliptical gain value using elliptical gain parameters and the extracted position and a multiplier configured to output an output value by multiplying the elliptical gain value by a weight for the pixel. The lens shading correction circuit corrects the lens shading based on the first output value and a gain increment value.

19 Claims, 11 Drawing Sheets

132a

(51) Int. Cl.

| | |
|---|---|
| *H04N 23/72* | (2023.01) |
| *H04N 23/75* | (2023.01) |
| *H04N 23/76* | (2023.01) |
| *H04N 25/51* | (2023.01) |

(58) Field of Classification Search

CPC .... H04N 23/81; H04N 23/811; H04N 25/611; G06T 5/80

See application file for complete search history.

(56) References Cited

U.S. PATENT DOCUMENTS

| | | | | |
|---|---|---|---|---|
| 7,408,576 | B2 * | 8/2008 | Pinto | H04N 23/81 |
| | | | | 348/E5.041 |
| 8,023,014 | B2 | 9/2011 | Kim et al. | |
| 8,049,795 | B2 | 11/2011 | Noh | |
| 8,358,319 | B2 | 1/2013 | Cote et al. | |
| 8,406,557 | B2 | 3/2013 | Park et al. | |
| 8,957,998 | B2 | 2/2015 | Hyun | |
| 9,204,057 | B2 | 12/2015 | Kato et al. | |
| 9,256,959 | B1 * | 2/2016 | Li | G06T 5/77 |
| 10,171,786 | B2 | 1/2019 | Bai et al. | |
| 2004/0095611 | A1 * | 5/2004 | Watanabe | H04N 1/401 |
| | | | | 358/461 |
| 2009/0190006 | A1 * | 7/2009 | Huggett | H04N 25/61 |
| | | | | 348/241 |
| 2013/0321695 | A1 * | 12/2013 | Kato | H04N 23/81 |
| | | | | 348/362 |

OTHER PUBLICATIONS

Zheng, et al., "Single-Image Vignetting Correction Using Radial Gradient Symmetry", in Proceedings CVPR, IEEE Computer Society Conference on Computer Vision and Pattern Recognition, Jul. 2008, Found on the internet at https://www.researchgate.net/publication/4351059, DOI: 10.1109/CVPR.2008.4587413, 9 pages.

Zheng, et al., "Single-Image Vignetting Correction", in IEEE Transactions on Pattern Analysis and Machine Intelligence, vol. 31, No. 12, Dec. 2009, found on the internet at https://www.researchgate.net/publication/38015402, DOI: 10.1109/TPAMI.2008.263, 15 pages.

Nam Kim, et al., "An Elliptical Lens Shading Correction Based on Color Channel Independency", ITC-CSCC; International Technical Conference on Circuits Systems, Computers and Communications, 2009.

Jooyoung Ha, et al., :"VLSI Implementation of Adaptive Shading Correction System Supporting Multi-Resolution for Mobile Camera", The Journal of Korean Institute of Communications and Information Sciences, vol. 31, Issue 12C, 2006.

EESR issued on May 15, 2024 in corresponding EP Patent Application No. 24154066.5.

* cited by examiner

LENS SHADING CORRECTION CIRCUIT, LENS SHADING CORRECTION METHOD, AND IMAGE PROCESSING SYSTEM

CROSS-REFERENCE TO RELATED APPLICATION

This U.S. patent application claims priority under 35 U.S.C. § 119 to Korean Patent Application No. 10-2023-0011861, filed on Jan. 30, 2023, in the Korean Intellectual Property Office, the disclosure of which is incorporated by reference in its entirety herein.

1. TECHNICAL FIELD

The inventive concept relates to an image processing system, and more particularly, to a lens shading correction circuit, a lens shading correction method, and an image processing system using an elliptical gain value.

2. DISCUSSION OF RELATED ART

An imaging system includes an image sensor that detects and conveys information to form an image. Examples of the image sensor include a charge-coupled device (CCD) sensor and an active-pixel sensor such as a complementary-metal-oxide-semiconductor (CMOS) sensor. The image sensor may include one or more lenses and one or more pixels.

Lens shading or vignetting refers to an optical phenomenon occurring in the imaging system where the amount of light incident on a pixel located in a center portion of the image sensor is different from the amount of light incident on a pixel located in a peripheral portion of the image sensor due to optical characteristics of the lens. Thus, due to lens shading or vignetting, that is, due to a brightness decrease in a direction toward the periphery of an image, image intensity decreases in the direction toward the periphery of the image. Therefore, a lens shading or vignetting correction method is needed to increase image quality.

SUMMARY

At least one embodiment of the inventive concept provides a lens shading correction/compensation method for preventing an image from standing out during lens shading correction/compensation, and/or a lens shading correction/compensation circuit configured to perform a method of adjusting the color of each pixel of an image by considering all pixels of the image, and a lens shading correction/compensation method.

According to an aspect of the inventive concept, there is provided a lens shading correction circuit for correcting lens shading. The lens shading correction circuit includes an elliptical gain generation circuit configured to extract a position of a pixel and generate an elliptical gain value using elliptical gain parameters and the extracted position and a first multiplier configured to output a first output value by multiplying the elliptical gain value by a weight of the pixel. The lens shading correction circuit corrects the lens shading based on the first output value and a gain increment value.

According to an aspect of the inventive concept, there is provided a lens shading correction method. The lens shading correction method includes extracting a position of a pixel, generating an elliptical gain value using the extracted position of the pixel and elliptical gain parameters, generating a first output value by multiplying the elliptical gain value by a weight for the pixel, and correcting lens shading based on the first output value and a gain increment value.

According to another aspect of the inventive concept, there is provided an image processing system including an image sensor and an image signal processor. The image signal processor includes a register storing elliptical gain parameters and a lens shading correction circuit. The lens shading correction circuit includes an elliptical gain generation circuit configured to extract a position of a pixel and generate an elliptical gain value using the elliptical gain parameters and a first multiplier configured to output a first output value by multiply the elliptical gain value by a weight for the pixel. The lens shading circuit corrects lens shading using the first output value and a gain increment value.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Hereinafter, embodiments of the inventive concept will be described with reference to the accompanying drawings.

Figure 1:
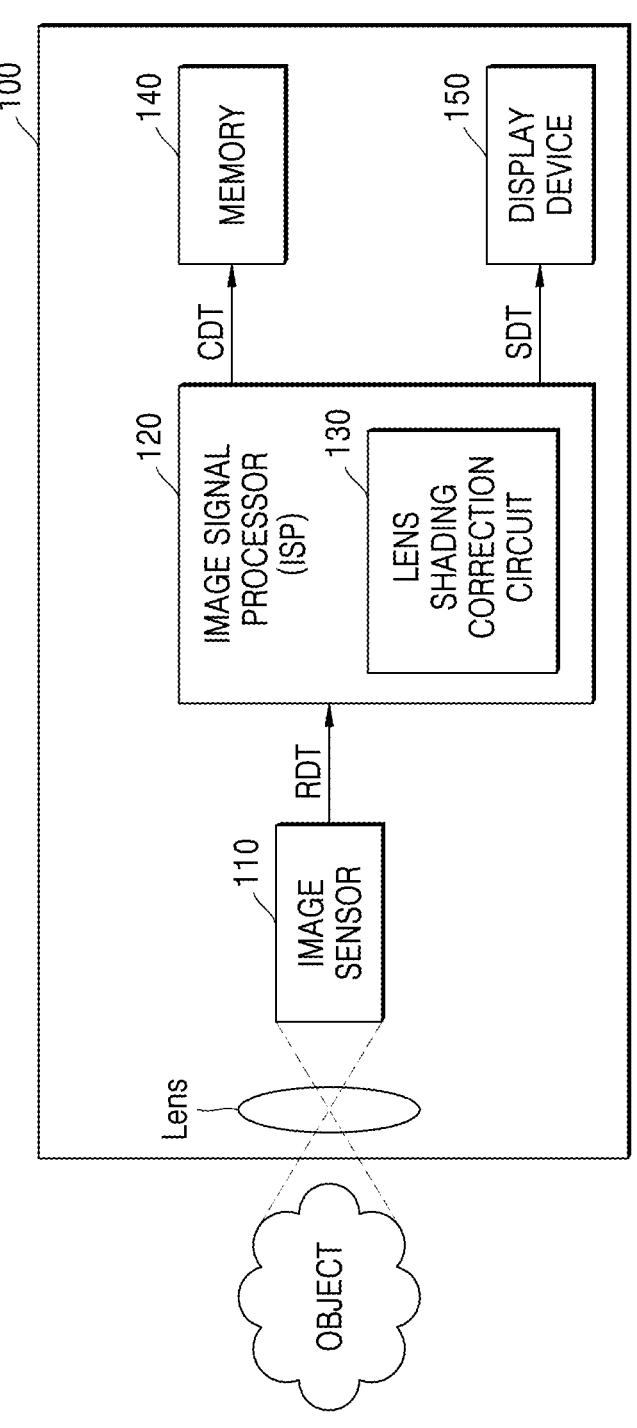
FIG. 1 is a block diagram illustrating an image processing system according to an embodiment.

FIG. 1 is a block diagram illustrating an image processing system 100 according to an embodiment.

Referring to FIG. 1, the image processing system 100 may be embedded in an electronic device or implemented as an electronic device. For example, the electronic device may be implemented as a personal computer (PC), an Internet of Things (IoT) device, or a portable electronic device. Examples of the portable electronic devices may include laptop computers, mobile phones, smartphones, tablet PCs, personal digital assistants (PDAs), enterprise digital assistants (EDAs), digital still cameras, digital video cameras, audio devices, portable multimedia players (PMPs), personal navigation devices (PNDs), MP3 players, handheld game consoles, e-books, wearable devices, and the like.

In an embodiment, the image processing system 100 includes an image sensor 110, an image signal processor 120, a memory 140, and a display device 150.

The image sensor 110 may convert an optical signal of an object incident through an optical lens into an electrical signal or image (that is, image data). For example, the image sensor 110 may include a pixel array including a plurality of two-dimensionally arranged pixels, and a sensing circuit. The pixel array may be configured to convert received optical signals into electrical signals. The pixel array may be implemented using photoelectric conversion elements such as charge coupled devices (CCDs) or complementary metal oxide semiconductors (CMOS). In addition, the pixel array may be implemented using other various types of photoelectric conversion elements. The sensing circuit may convert an electrical signal provided from the pixel array into an image and may output the image as a raw image RDT. The image sensor 110 may be implemented as a semiconductor chip including a pixel array and a sensing circuit.

In an embodiment, the image signal processor 120 processes the raw image RDT provided from the image sensor 110 to generate a converted image CDT. For example, the image signal processor 120 may perform image processing on the raw image RDT based on at least one of a set white balance, one or more parameters, and a color space. The converted image CDT may be a color-space image such as a red-green-blue (RGB) or YUV image. For example, in the YUV image, Y may represent brightness or a luma value and UV may represent color or chroma values. The size, for example, resolution, of the converted image CDT may be the same as that of the raw image RDT. The converted image CDT may be stored in a memory (the memory 140 shown in FIG. 1). The memory 140 may be a volatile memory such as dynamic random access memory (DRAM) or static RAM (SRAM), or a non-volatile memory such as phase change RAM (PRAM), resistive RAM (ReRAM), or flash memory. The converted image CDT stored in the memory (for example, the memory 140 shown in FIG. 1) may be later used in the image processing system 100 or may be stored in a storage device.

In addition, the image signal processor 120 may generate a scaled image SDT by reducing or increasing the size of the converted image CDT. For example, the image signal processor 120 may generate the scaled image SDT by scaling the size, that is, the resolution, of the converted image CDT according to the resolution of the display device 150. For example, the image signal processor 120 may adjust the converted image CDT to support the resolution of the display device 150. The image signal processor 120 may provide the scaled image SDT to the display device 150.

In addition, the image signal processor 120 may include a lens shading correction circuit 130 to perform image processing using the lens shading correction circuit 130. The image signal processor 120 may perform vignetting correction or lens shading correction on the raw image RDT output from the image sensor 110 to generate a corrected image. The image signal processor 120 may temporarily store data corresponding to the raw image RDT in the lens shading correction circuit 130 and perform image processing (for example, correction or compensation) on the stored data. For example, after completing the image processing on the raw image RDT, the image signal processor 120 may store the raw image RDT and perform image processing on another updated raw image RDT.

For example, the image signal processor 120 may remove artifacts of a raw image RDT captured in a low illumination environment. For example, the image signal processor 120 may predict image data in locations of the artifacts and replace the artifacts with the predicted image data. Examples of the lens shading correction circuit 130 of the image signal processor 120 are described with reference to FIGS. 2, 3, and 8, and lens shading correction methods are described with reference to FIGS. 4, 5 and 9.

Figure 2:
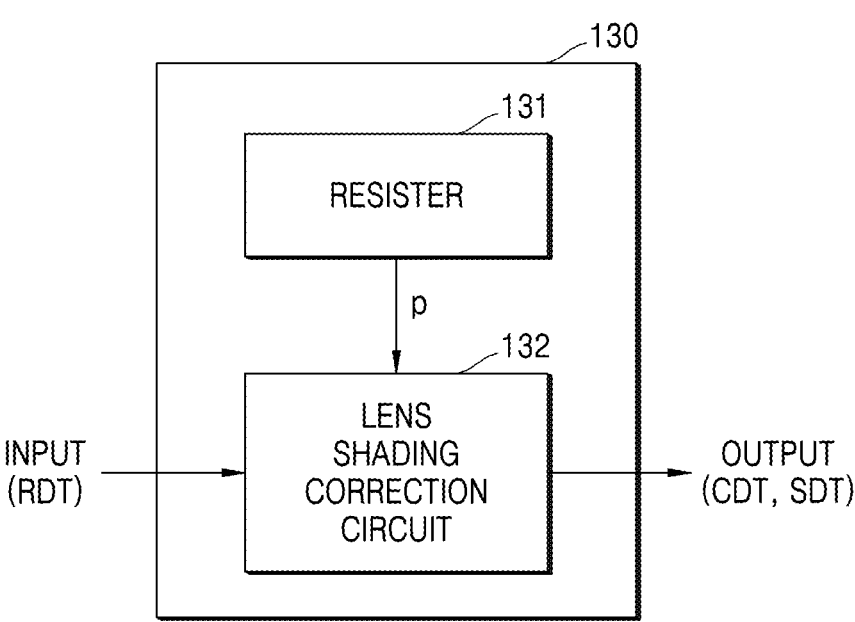
FIG. 2 is a block diagram illustrating an image signal processor according to an embodiment.

FIG. 2 is a block diagram illustrating an image signal processor 130 according to an embodiment.

Referring to FIG. 2, in an embodiment, the image signal processor 130 includes a register 131 and a lens shading correction circuit 132. For example, the register 131 may be a hardware register including one or more flip flips but is not limited thereto. The lens shading correction circuit 132 may also be referred to as a lens shading compensation circuit.

The register 131 may store elliptical gain parameters p. The elliptical gain parameters p may include first to fourth parameters fA, fB, cA, and eB. The first to fourth parameters fA, fB, eA, and eB are described later with reference to FIG. 3 and Equation 1. Because the register 131 stores the first to fourth parameters fA, fB, cA, and eB, use of the register 131 may be reduced, and power consumption of the image signal processor 120 may be reduced. For example, use of the register 131 instead of a larger memory device may reduce power consumption.

The lens shading correction circuit 132 may perform a method of correcting (or compensating) an input image INPUT (RDT) (or input image data) to be processed. The method may perform a lens shading correction on the input image RDT. In an embodiment, the method adjusts at least one of color or color difference components of each pixel of an input image INPUT (RDT) to be processed by considering the brightness of the pixels of the input image INPUT (RDT). An embodiment of the lens shading correction circuit 132 is described with reference to FIG. 3.

Figure 3:
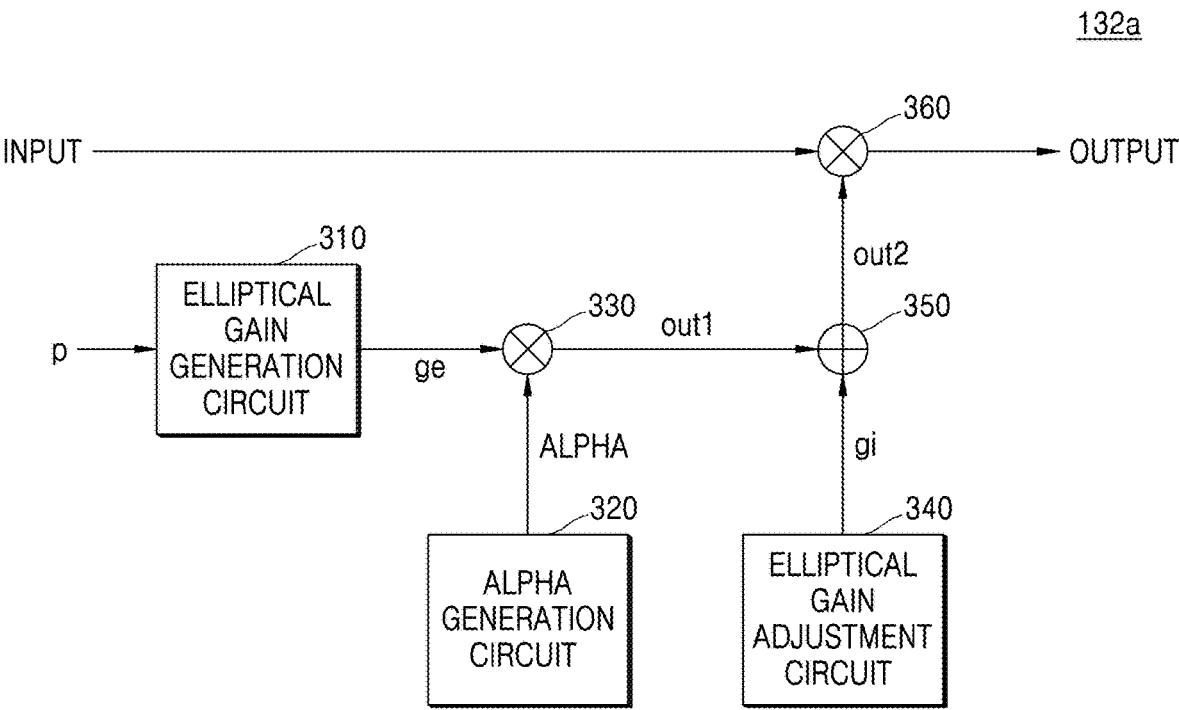
FIG. 3 is a block diagram illustrating a lens shading correction circuit according to an embodiment.

FIG. 3 is a block diagram illustrating a lens shading correction circuit 132a according to an embodiment.

The lens shading correction circuit 132a shown in FIG. 3 may correspond to the lens shading correction circuit 132 shown in FIG. 2. The lens shading correction circuit 132a shown in FIG. 3 is merely an example of the lens shading correction circuit 132 shown in FIG. 2, and the same description as that given with reference to FIG. 2 may be omitted.

Referring to FIG. 3, the lens shading correction circuit 132a includes an elliptical gain generation circuit 310, an alpha generation circuit 320, a first multiplier 330, an elliptical gain adjustment circuit 340, an adder 350 (e.g., an adding circuit or a logic circuit for performing an addition operation), and a second multiplier 360 (e.g., a multiplier circuit or a logic circuit for performing a multiplication operation).

The elliptical gain generation circuit 310 may extract the position of a pixel and may generate an elliptical gain value ge using elliptical gain parameters p and the extracted position.

In an embodiment, the elliptical gain parameters p include a first parameter fA, a second parameter fB, a third parameter eA, and a fourth parameter eB. The first parameter fA and the second parameter fB may be parameters of an nth degree equation (where n is 4). For example, the nth degree equation may be a bi-quadratic equation or an equation of an ellipse. The third parameter eA may be an ellipse parameter of the pixel in a first direction, and the fourth parameter eB may be an ellipse parameter of the pixel in a second direction different from the first direction.

Figure 6:
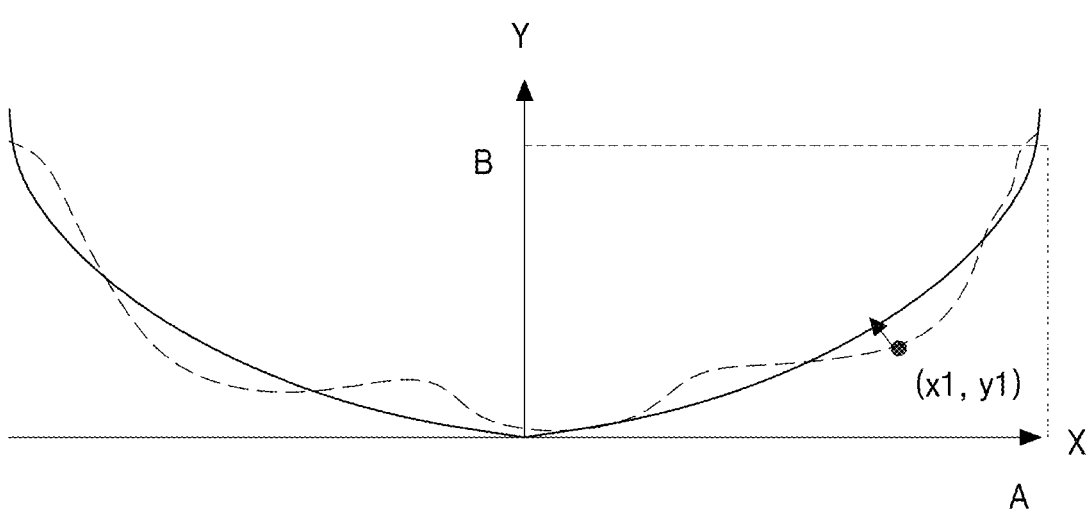
FIGS. 6 and 7 are graphs illustrating lens shading correction according to pixel positions, according to embodiments.

Referring to FIG. 6 (described later), a pixel is located in a two-dimensional (2D) plane, and the position of the pixel may include a first position value x1 in a first direction and a second position value y1 in a second direction. The first direction and the second direction may be orthogonal to each other. For example, when the first direction is a horizontal direction on the 2D plane, the second direction may be a vertical direction orthogonal to the first direction on the 2D plane.

In an embodiment, the elliptical gain generation circuit 310 generates different elliptical gain values according to pixel positions. The elliptical gain generation circuit 310 may generate an elliptical gain value ge using a bi-quadratic equation, elliptical gain parameters p, and pixel position values x1 and y1.

$$\text{gain}_{elliptic} = fA \times \left( \frac{x^2}{eA} + \frac{y^2}{eB} \right) \times \left( C1 + (fB + C2) \times \left( \frac{x^2}{eA} + \frac{y^2}{eB} \right) \right) \quad \text{[Equation 1]}$$

In Equation 1, $\text{gain}_{elliptic}$ may refer to an elliptical gain value ge, fA may refer to a first parameter, fB may refer to a second parameter, cA may refer to a third parameter, eB may refer to a fourth parameter, and x and y may refer to a pixel position. The first parameter and the second parameter may be parameters related to a bi-quadratic equation, and the third parameter and the fourth parameter may be ellipse parameters. C1 and C2 may each refer to a constant. For example, the third parameter may be a parameter related to the long axis of an ellipse's equation, and the fourth parameter may be a parameter related to the short axis of the ellipse's equation.

The alpha generation circuit 320 may store and output an alpha value ALPHA that is a weight for a pixel. Here, the alpha value ALPHA may refer to a weight for a pixel, and the alpha value ALPHA may vary according to the characteristics of the image sensor 110 (refer to FIG. 1).

The first multiplier 330 may receive the elliptical gain value ge output from the elliptical gain generation circuit 310 and the alpha value ALPHA output from the alpha generation circuit 320. In an embodiment, the first multiplier 330 generates a first output value out1 by multiplying the elliptical gain value ge by the alpha value ALPHA.

The elliptical gain adjustment circuit 340 may generate a gain increment value gi for adjusting the elliptical gain value ge. Here, the gain increment value gi may refer to a value for selecting a method of applying the elliptical gain value ge to an initial input value INPUT. For example, when the initial input value INPUT is maintained, 1 may be added to the elliptical gain value ge, and when the initial input value INPUT is not maintained, the elliptical gain value ge may be maintained.

The adder 350 may receive the gain increment value gi output from the elliptical gain adjustment circuit 340 and the first output value out1 output from the first multiplier 330. The adder 350 may generate a second output value out2 by adding the gain increment value gi to the first output value out1.

The second multiplier 360 may receive the second output value out2 output from the adder 350 and the initial input value INPUT. The initial input value INPUT may refer to a position value of the pixel. The second multiplier 360 may generate a final output value OUTPUT by multiplying the second output value out2 and the initial input value INPUT together. The final output value OUTPUT may refer to a position value of the pixel after lens shading correction is performed.

Figure 4:
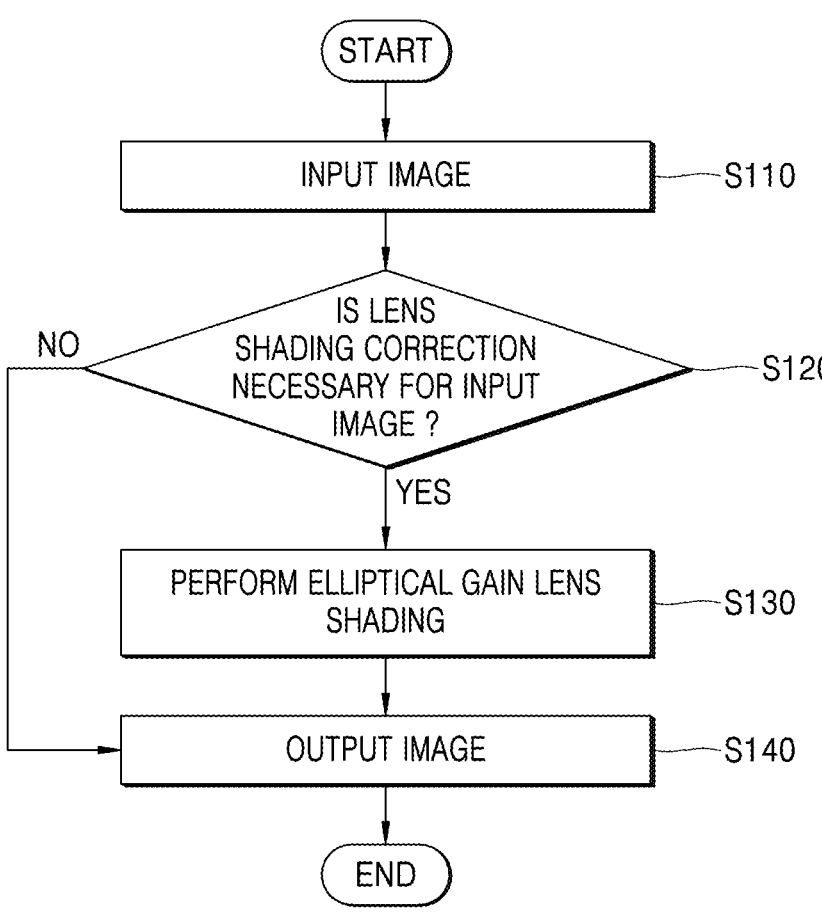
FIG. 4 is a flowchart illustrating a lens shading correction method according to an embodiment.

FIG. 4 is a flowchart illustrating a lens shading correction method according to an embodiment.

Referring to FIG. 4, an image signal processor receives an image from an image sensor (S110).

For example, referring to FIG. 1, the image signal processor 120 may receive a raw image RDT from the image sensor 110. The raw image RDT may include a plurality of pixels. The image signal processor 120 may extract a pixel requiring lens shading correction. For example, referring to FIG. 6, the pixel may be located on a 2D plane, and the position of the pixel may include a first position value x1 in a first direction and a second position value y1 in a second direction orthogonal to the first direction. Extracting the pixel may refer to finding the first position value x1 and the second position value y1 of the pixel.

A lens shading correction circuit determines whether lens shading correction is necessary for the received image (S120).

For example, referring to FIG. 2, the lens shading correction circuit 132 may adjust at least one of color or color difference components of each pixel by considering the brightness of the pixels included in the received image.

When it is determined that lens shading correction is necessary (S120, YES), the lens shading correction circuit performs elliptical gain lens shading (S130).

For example, referring to FIG. 3, the elliptical gain generation circuit 310 may generate an elliptical gain value ge using a bi-quadratic equation, elliptical gain parameters p, and position values of the pixel. The elliptical gain generation circuit 310 may generate different elliptical gain values according to pixel positions. For example, the elliptical gain generation circuit 310 may generate an elliptical gain value ge for each pixel of the received image. The alpha generation circuit 320 may store and output an alpha value ALPHA that is a weight for the pixel. The first multiplier 330 may generate a first output value out1 by multiplying the elliptical gain value ge by the alpha value ALPHA. The elliptical gain adjustment circuit 340 may generate a gain increment value gi for adjusting the elliptical gain value ge. The adder 350 may generate a second output value out2 by adding the gain increment value gi to the first output value out1. The second multiplier 360 may generate a final output value OUTPUT by multiplying the second output value out2 and an initial input value INPUT together.

The lens shading correction circuit 132a may perform lens shading to generate an elliptical gain value for each pixel that needs compensation or correction, thereby outputting an image in which a darkened part due to vignetting is compensated for. For example, the lens shading may be performed on the input image to generate the output image.

The image signal processor outputs the image (S140). For example, the image signal processor 120 may output the output image. In addition, when it is determined that lens shading correction is not necessary (S120, NO), the image signal processor may output the image (S140). For example, when the lens shading correction is not necessary, the input image may be output as the output image.

For example, referring to FIG. 1, the image signal processor 120 may generate a converted image CDT by performing image processing on a raw image RDT provided from the image sensor 110 and may provide the converted image CDT to the memory 140. The image signal processor 120 may generate a scaled image SDT through resolution scaling and may provide the scaled image SDT to the display device 150.

Figure 5:
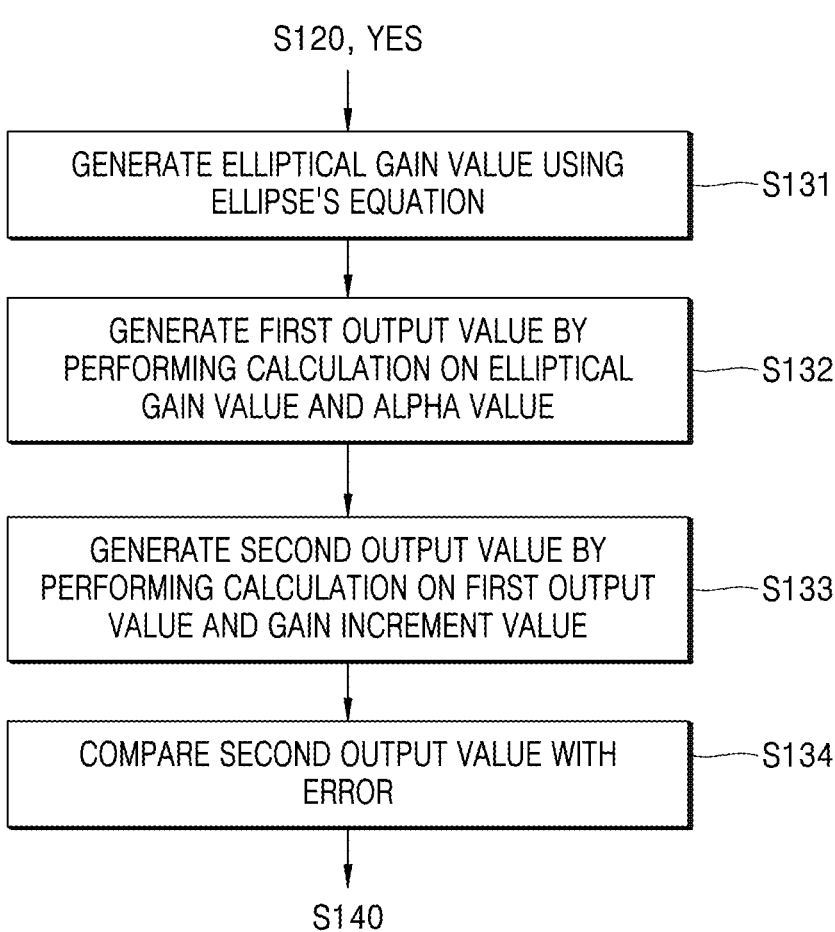
FIG. 5 is a flowchart illustrating a method of performing elliptical gain lens shading, according to an embodiment.

FIG. 5 is a flowchart illustrating a method of performing elliptical gain lens shading, according to an embodiment.

Referring to FIGS. 3 and 5, the elliptical gain generation circuit 310 generates an elliptical gain value ge using an ellipse's equation (S131).

The first multiplier 330 generates a first output value out1 by performing a calculation on the elliptical gain value ge by an alpha value ALPHA (S132). For example, the elliptical gain value ge may be multiplied by the alpha value ALPHA to generate the first output value out1.

The adder 350 generates a second output value out2 through a calculation on the first output value out1 and the gain increment value gi (S133). For example, the adder 350 may add the first output value out1 to the gain increment value gi to generate the second output value out2.

The lens shading correction circuit 132a compares the second output value out2 with an error (S134). The result of the comparison may be used to perform an image correction.

Figure 7:
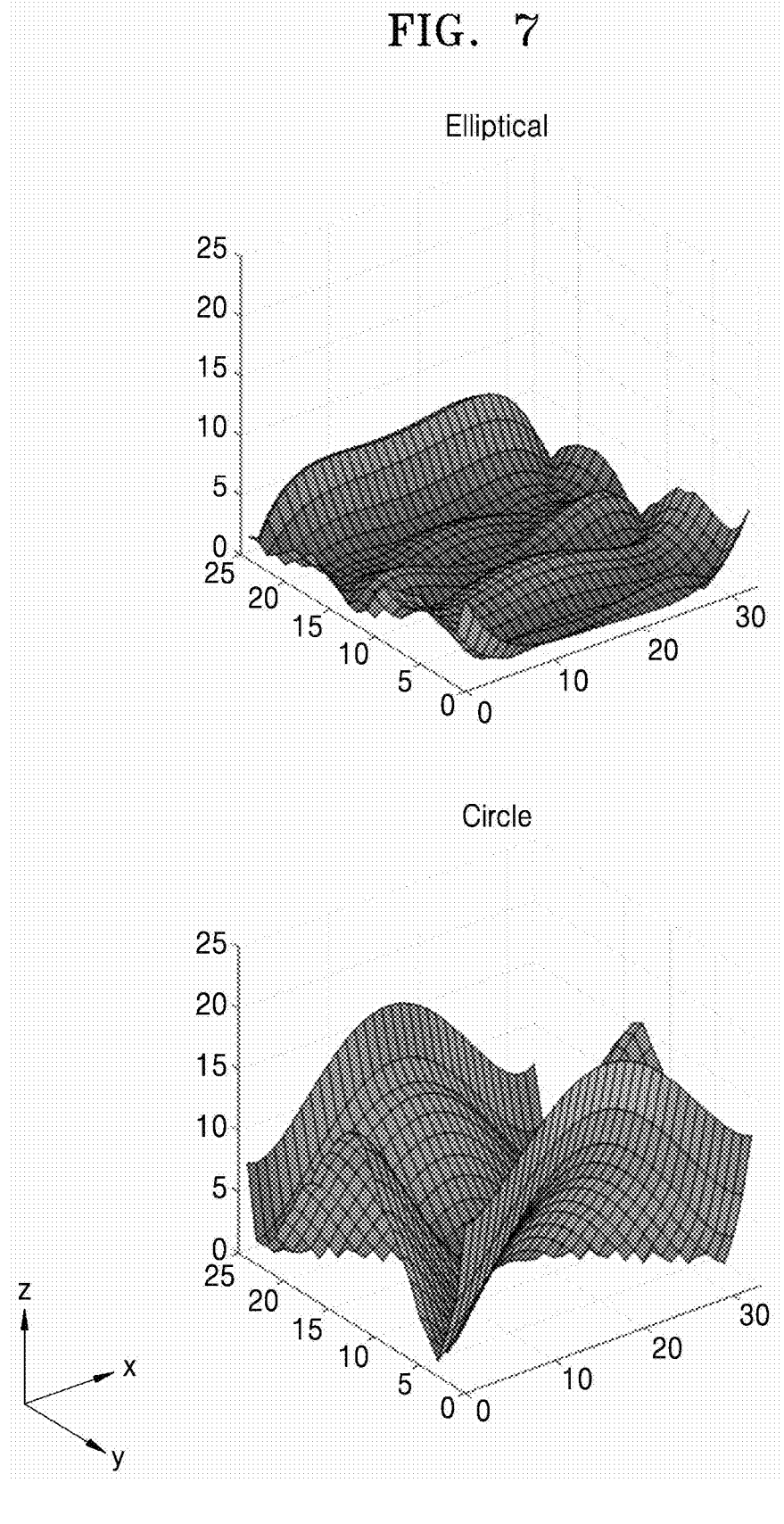

FIGS. 6 and 7 are graphs illustrating lens shading correction according to pixel positions, according to embodiments.

Referring to FIG. 6, a pixel is located on a 2D plane, and the position of the pixel may include a first position value x1 in a first direction and a second position value y1 in a second direction. The first direction and the second direction may be orthogonal to each other. For example, when the first direction is a horizontal direction on the 2D plane, the second direction may be a vertical direction orthogonal to the first direction. The first direction may indicate a pixel position, and the second direction may indicate a gain value.

A dashed line may indicate a gain value required for lens shading correction, and a solid line may indicate a value having the smallest error when the gain value required for lens shading correction is compared with an ideal gain value. Referring to FIG. 7, an upper graph (elliptical) indicates errors after an elliptical gain lens shading correction is performed, and a lower graph (circle) indicates errors after a circular gain lens shading correction is performed.

For example, the upper graph (elliptical) may indicate errors when elliptical gain lens shading correction is performed, and gain values required for elliptical lens shading correction are compared with ideal gain values. In addition, the lower graph may indicate errors when circular lens shading correction is performed rather than elliptical lens shading correction, and gain values required for circular lens shading correction are compared with ideal gain values. FIG. 7 merely illustrates an example of the inventive concept, and the inventive concept is not limited thereto.

In addition, a first direction (X direction) may indicate the position of a pixel in the X direction, a second direction (Y direction) orthogonal to the first direction (X direction) may indicate the position of the pixel in the Y direction, and a third direction orthogonal to the first direction (X direction) and to the second direction (Y direction) may indicate a gain difference (%).

Referring to FIGS. 6 and 7 together, even when the first position values x1 and the second position values y1 of pixels are different from each other, an image obtained by correcting (compensating) an image darkened due to vignetting may be output through elliptical gain lens shading correction.

Figure 8:
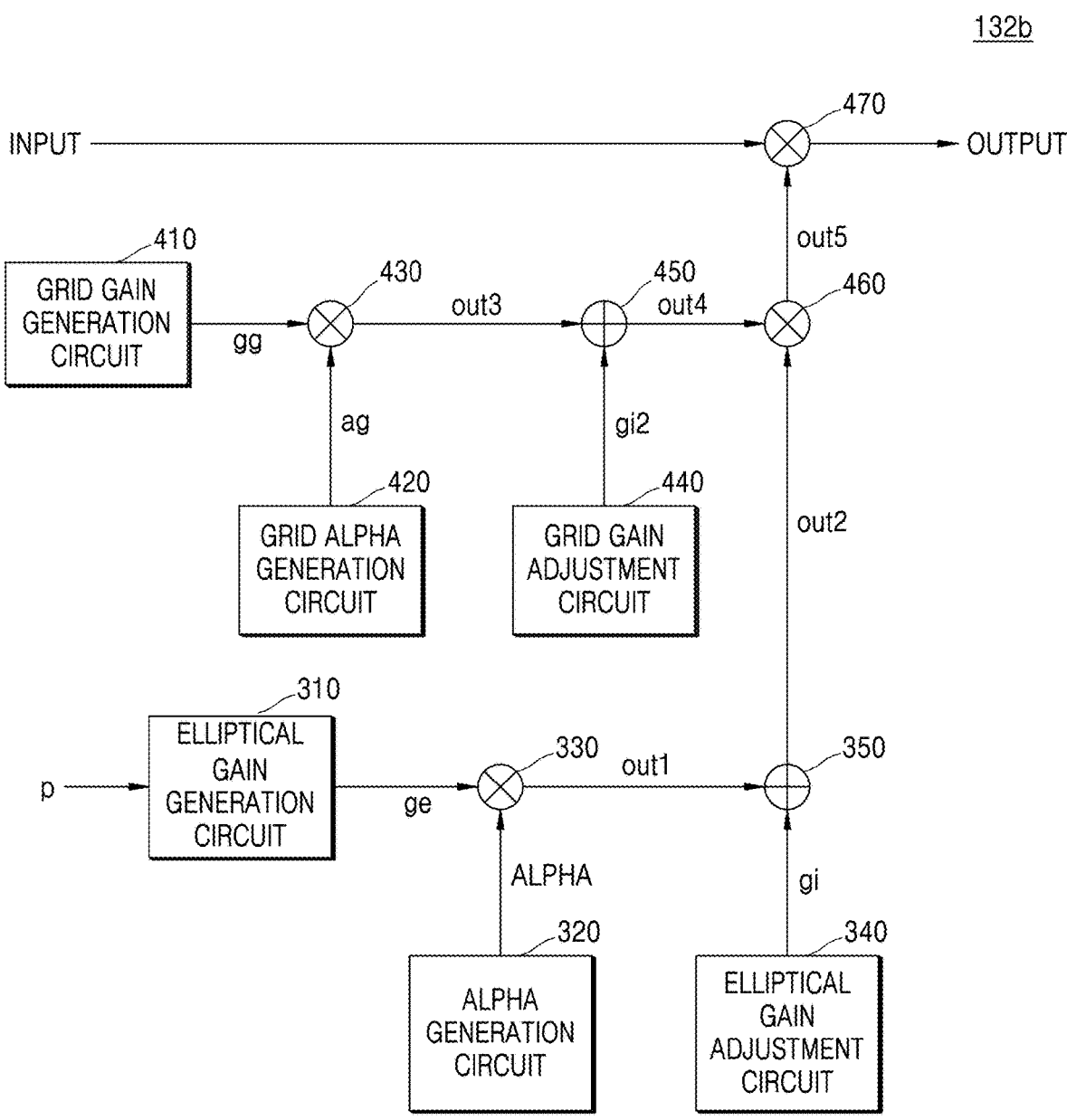
FIG. 8 is a block diagram illustrating a lens shading correction circuit according to an embodiment.

FIG. 8 is a block diagram illustrating a lens shading correction circuit 132b according to an embodiment.

The lens shading correction circuit 132b shown in FIG. 8 may correspond to the lens shading correction circuit 132 shown in FIG. 2 and the lens shading correction circuit 132a shown in FIG. 3. FIG. 8 shows another embodiment of the lens shading correction circuit 132a shown in FIG. 3, and the same descriptions as those given with reference to FIGS. 2 and 3 may be omitted.

Referring to FIG. 8, the lens shading correction circuit 132b includes an elliptical gain generation circuit 310, an alpha generation circuit 320, a first multiplier 330, an elliptical gain adjustment circuit 340, a first adder 350, a grid gain generation circuit 410, a grid alpha generation circuit 420, a second multiplier 430, a grid gain adjustment circuit 440, a second adder 450, a third multiplier 460, and a fourth multiplier 470.

The grid gain generation circuit 410 may generate a grid gain value gg. The grid gain generation circuit 410 may generate different grid gain values gg according to pixel positions. The grid gain generation circuit 410 may provide the generated grid gain value gg to the second multiplier 430.

The grid alpha generation circuit 420 may store and output a grid alpha value ag. Here, the grid alpha value ag may refer to a weight for a grid pixel, and the grid alpha value ag may vary depending the characteristics of the image sensor 100 (refer to FIG. 1). The grid alpha generation circuit 420 may provide the grid alpha value ag to the second multiplier 430.

The second multiplier 430 may receive the grid gain value gg output from the grid gain generation circuit 410 and the grid alpha value ag output from the grid alpha generation circuit 420. In an embodiment, the second multiplier 430 generates a third output value out3 by multiplying the grid gain value gg by the grid alpha value ag.

The grid gain adjustment circuit 440 may generate a grid gain increment value gi2 for adjusting the grid gain value gg. Here, the grid gain increment value gi2 may refer to a value for selecting a method of applying the grid gain value gg to an initial input value INPUT.

The second adder 450 may receive the grid gain increment value gi2 output from the grid gain adjustment circuit 440 and the third output value out3 output from the second multiplier 430. The second adder 450 may generate a fourth output value out4 by adding the grid increment value gi2 to the third output value out3.

The third multiplier 460 may receive the fourth output value out4 generated by the second adder 450 and a second output value out2 generated by the first adder 350. The third multiplier 460 may generate a fifth output value out5 by multiplying the fourth output value out4 by the second output value out2.

The fourth multiplier 470 may receive the initial input value INPUT and the fifth output value out5 output from the third multiplier 460. The fourth multiplier 470 may multiply the initial input value INPUT by the fifth output value out5 to generate a final output value OUTPUT.

Figure 9:
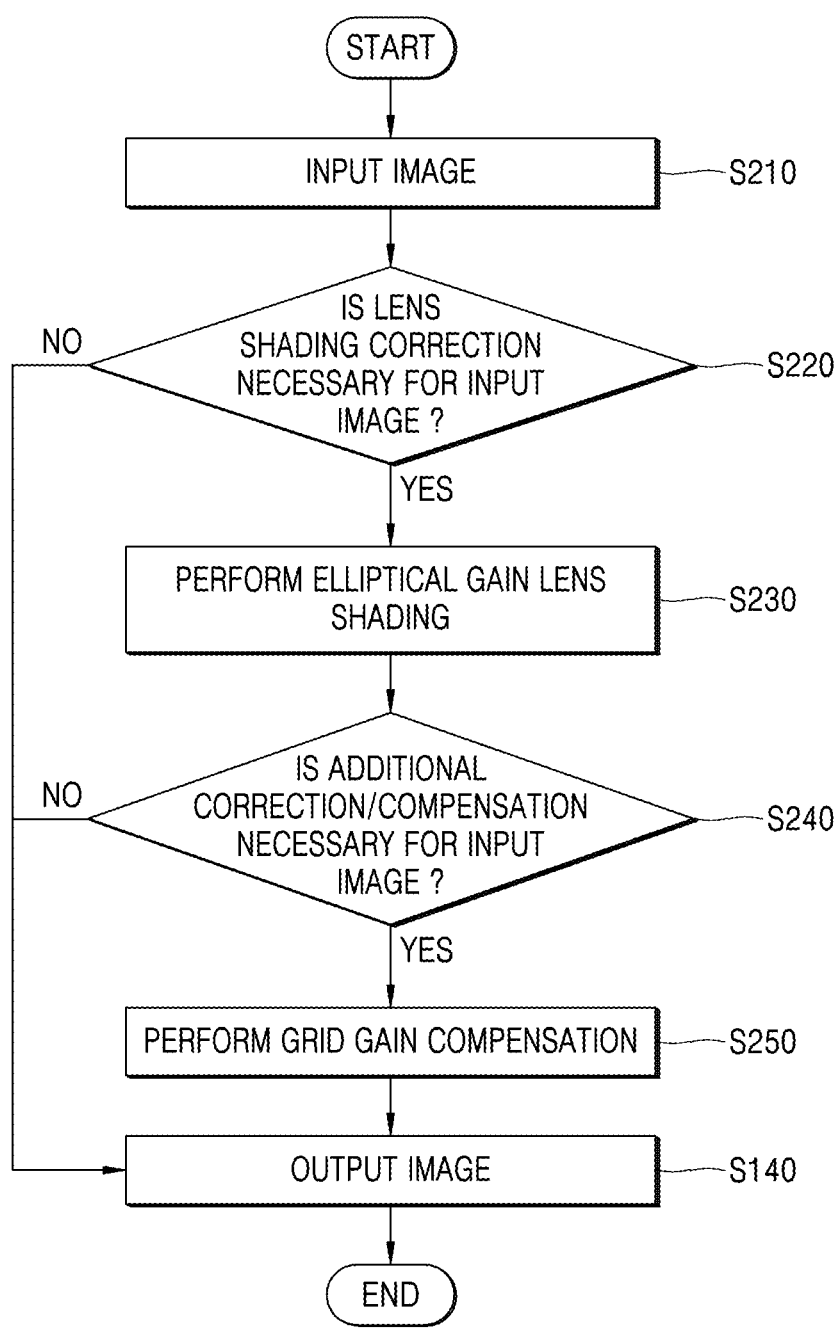
FIG. 9 is a flowchart illustrating a lens shading correction method according to an embodiment.

FIG. 9 is a flowchart illustrating a lens shading correction method according to an embodiment. The same description as that given with reference to FIG. 4 may be omitted.

Referring to FIG. 9, an image signal processor receives an image from an image sensor (S210).

A lens shading correction circuit (e.g., 132, 132a, or 132b) determines whether lens shading correction is necessary for the input image (S220).

When it is determined that lens shading correction is necessary (S220, YES), the lens shading correction circuit performs elliptical gain lens shading (S230). For example, the elliptical gain lens shading is performed on the input image to generate a first compensated image when it is determined that lens shading correction is necessary.

The lens shading correction circuit determines whether additional correction/compensation is necessary for the received image (S240). For example, the lens shading correction circuit determines whether additional correction/compensation is necessary for the input image when the elliptical gain lens shading is not performed and for the first compensated image when the elliptical gain lens shading is performed.

When it is determined that additional compensation is necessary (S240, YES), the lens shading correction circuit performs grid gain compensation (S250).

For example, referring to FIG. 8, the grid gain generation circuit 410 may generate a grid gain value gg. The grid alpha generation circuit 420 may store and output a grid alpha value ag. The second multiplier 430 may generate a third output value out3 by multiplying the grid gain value gg by the grid alpha value ag. The grid gain adjustment circuit 440 may generate a grid gain increment value gi2 for adjusting the grid gain value gg. The second adder 450 may generate a fourth output value out4 by adding the grid increment value gi2 to the third output value out3. The third multiplier 460 may generate a fifth output value out5 by multiplying the fourth output value out4 by a second output value out2. The fourth multiplier 470 may multiply the fifth output value out5 by an initial input value INPUT to generate a final output value OUTPUT.

The lens shading correction circuit 132b may perform lens shading to generate an elliptical gain value for each pixel requiring compensation or correction and may output a clear image from which vignetting is removed through the lens shading.

The image signal processor outputs the output image (S140). In addition, when it is determined that lens shading correction is not necessary (S220, NO) or additional correction/compensation is not necessary (S240, NO), the image signal processor may output the image (S140). For example, the image signal processor 120 may output the input image as the output image when no corrections/compensations are performed or output a corrected/compensated version of the input image as the output image when at least one correction/compensation is performed on the input image.

Figure 10:
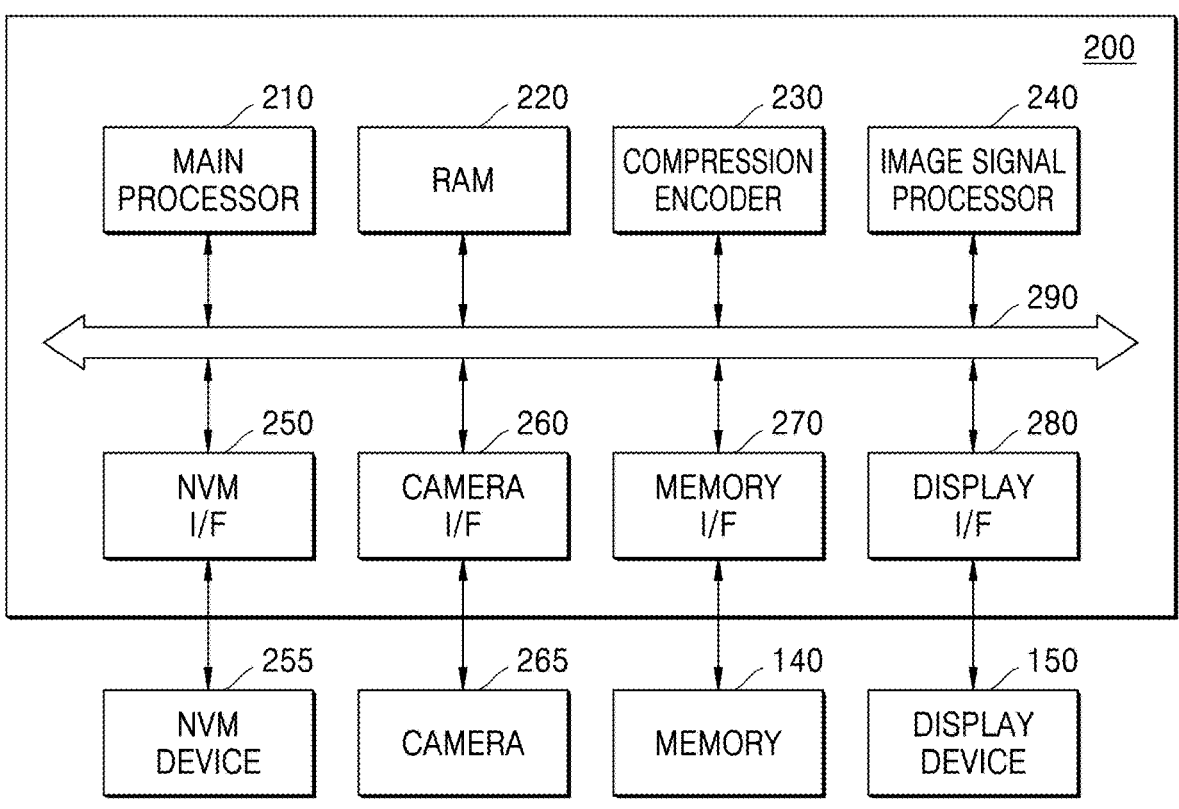
FIG. 10 is a block diagram illustrating an application processor according to an embodiment.

FIG. 10 is a block diagram illustrating an application processor 200 according to an embodiment.

Referring to FIG. 10, the application processor 200 may include a main processor 210, a random access memory (RAM) 220, a compression encoder 230, an image signal processor 240, a non-volatile memory interface 250, a camera interface 260, a memory interface 270, and a display interface 280. The components 210, 220, 230, 240, 250, 260, 270, and 280 of the application processor 200 may transmit and receive data through a bus 290.

The main processor 210 may control overall operations of the application processor 200. The main processor 210 may be implemented as, for example, a central processing unit (CPU), a microprocessor, or the like. In some embodiments, the main processor 210 may be implemented as one computing component having two or more independent processors (or cores), that is, a multi-core processor. The main processor 210 may process or execute programs and/or data stored in the RAM 220 (or a read only memory (ROM)).

The RAM 220 may temporarily store programs, data, and/or instructions. According to embodiments, the RAM 220 may be implemented as a dynamic RAM (DRAM) or a static RAM (SRAM). The RAM 220 may temporarily store images input/output through the non-volatile memory interface 250, the camera interface 260, the memory interface 270, and the display interface 280 or images generated by the image signal processor 240 or the main processor 210.

In an embodiment, the application processor 200 may further include a ROM. The ROM may store programs and/or data that are constantly used. The ROM may be implemented as an erasable programmable ROM (EPROM) or an electrically erasable programmable ROM (EEPROM).

The non-volatile memory interface 250 may handle data input from a non-volatile memory device 255 or data output to the non-volatile memory device 255. For example, the non-volatile memory device 255 may be implemented as a memory card (for example, a multimedia card (MMC), an embedded MMC (eMMC), a secure digital (SD), or a micro SD card) or the like.

The camera interface 260 may handle data (for example, a raw image) input from a camera 265 located outside the application processor 200. The camera 265 may generate data about an image photographed using a plurality of light sensing elements. A raw image received through the camera interface 260 may be provided to the image signal processor 240 or may be stored in the memory 140 (refer to FIG. 1) through the memory interface 270.

The memory interface 270 may handle data input from the memory 140 provided outside the application processor 200 or may handle data output to the memory 140. In some embodiments, the memory 140 (refer to FIG. 1) may be implemented as a volatile memory such as a DRAM or an SRAM, or a non-volatile memory such as an ReRAM, a PRAM, or a NAND flash memory.

The display interface 280 may handle data (for example, an image) output to the display device 150 (refer to FIG. 1). The display device 150 (refer to FIG. 1) may output image or video data through a display such as a liquid crystal display (LCD) or an active matrix organic light emitting diode (AMOLED) display.

The compression encoder 230 may encode an image to generate an encoded image and output the encoded image, that is, a compressed image. The compression encoder 230 may encode a converted image output from the image signal processor 240 or a converted image stored in the memory 140 (refer to FIG. 1). In an embodiment, the compression encoder 230 may be a Joint Photographic Experts Group (JPEG) module, and the JPEG module may output a JPEG format image. The JPEG format image may be stored in the non-volatile memory device 255.

The image signal processor 240 may perform image processing on an image such as a raw image provided from the camera 254 to generate a converted image. The image signal processor 240 may store the converted image in the memory 140 (refer to FIG. 1) or scale the converted image to provide the scaled image to the display device 150 (refer to FIG. 1).

The image signal processor 240 may perform vignetting correction or lens shading correction on a raw image output from an image sensor. For example, the image signal processor 240 may perform any of the above-described vignetting correction or lens shading correction. Therefore, an image in which a portion darkened due to vignetting is compensated for may be output.

Figure 11:
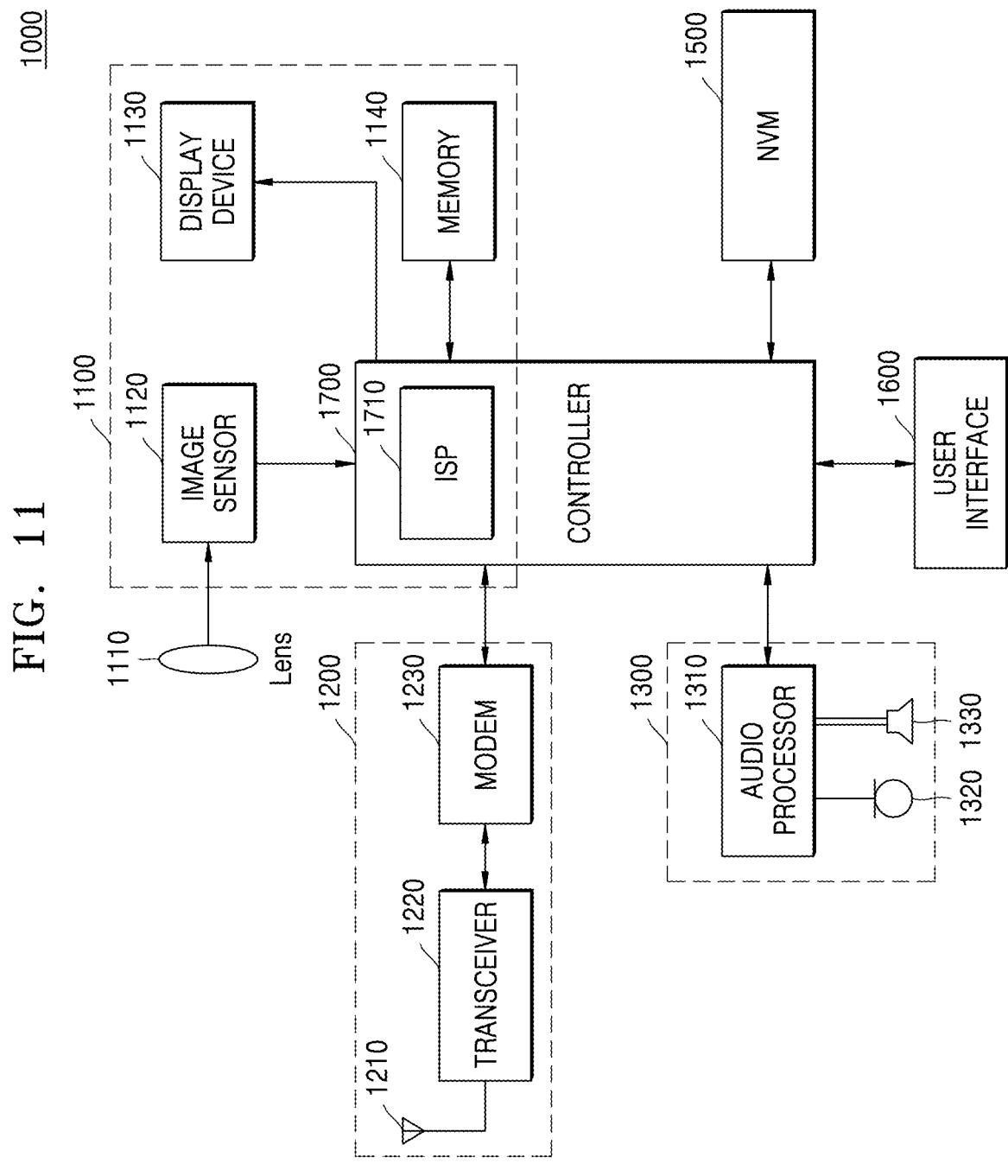
FIG. 11 is a block diagram illustrating a portable terminal according to an embodiment.

FIG. 11 is a block diagram illustrating a portable terminal 1000 according to an embodiment.

Referring to FIG. 11, the portable terminal 1000 of the embodiment may include an image processing unit 1100, a wireless communication device 1200, an audio processing unit 1300, a non-volatile memory device 1500, and a user interface 1600, and a controller 1700.

The image processing unit 1100 may include an image sensor 1120, a display device 1130, a memory 1140, and an image signal processor (ISP) 1710. The image processing unit 1100 may further include a lens 1110 or the lens 1110 may located outside the image processing unit 1100. In an embodiment, as shown in FIG. 11, the image signal processor 1710 may be implemented as part of the controller 1700.

The image signal processor 1710 may generate a converted image by performing image processing on an image such as a raw image provided from the image sensor 1120. The image signal processor 1710 may store the converted image in the memory 1140 or may scale the converted image to generate a scaled image and provide the scaled image to the to the display device 1130. The image signal processor 1710 may perform vignetting correction or lens shading correction on the raw image output from the image sensor 1120. Therefore, an image in which a portion darkened due to vignetting is compensated for may be output.

The wireless communication device 1200 may include an antenna 1210, a transceiver 1220, and a modem 1230. The audio processing unit 1300 may include an audio processor 1310, a microphone 1320, and a speaker 1330. The non-volatile memory device 1500 may be provided as a memory card (for example, an MMC, an cMMC, an SD card, or a micro SD card) or the like.

The user interface 1600 may be implemented as various devices capable of receiving user inputs, such as a keyboard, a curtain key panel, a touch panel, a fingerprint sensor, or a microphone. The user interface 1600 may receive a user input and provide a signal corresponding to the received user input to the controller 1700.

The controller 1700 may control overall operations of the portable terminal 1000 and may be implemented as a system-on-chip (SoC) configured to execute application programs, an operating system, or the like. A kernel of the operating system running on the system-on-chip may include an input/output (I/O) scheduler and a device driver for controlling the non-volatile memory device 1500.

While the inventive concept has been particularly shown and described with reference to embodiments thereof, it will be understood that various changes in form and details may be made therein without departing from the spirit and scope of the following claims.

What is claimed is:

1. A lens shading correction circuit for correcting lens shading, the lens shading correction circuit comprising:
   an elliptical gain generation circuit configured to extract a position of a pixel and generate an elliptical gain value using elliptical gain parameters and the extracted position;
   a first multiplier configured to output a first output value by multiplying the elliptical gain value by a weight for the pixel; and
   a second multiplier configured to output a final output value based on an initial input value and the first output value;
   the lens shading correction circuit correcting the lens shading based on the final output value.

2. The correction circuit of claim 1, further comprising:
   an adder configured to output a second output value by adding a gain increment value to the first output value,
   wherein the final output value is generated by multiplying the second output value by the initial input value.

3. The lens shading correction circuit of claim 1, wherein the elliptical gain generation circuit is further configured to generate different elliptical gain values according to the position of the pixel.

4. The lens shading correction circuit of claim 3, wherein the pixel is located on a two-dimensional (2D) plane, and the position of the pixel comprises a first position value in a first direction and a second position value in a second direction orthogonal to the first direction.

5. The lens shading correction circuit of claim 4, wherein the elliptical gain generation circuit is further configured to generate the elliptical gain value using an nth degree equation, the elliptical gain parameters, and the first and second position values of the pixel.

6. The lens shading correction circuit of claim 5, wherein the elliptical gain parameters comprise first to fourth parameters,
   the first parameter and the second parameter are parameters of the nth degree equation,
   the third parameter is an ellipse parameter in the first direction, and
   the fourth parameter is an ellipse parameter in the second direction.

7. The lens shading correction circuit of claim 1, further comprising a register storing the elliptical gain parameters.

8. The lens shading correction circuit of claim 6, wherein the first to fourth parameters minimize error of the pixel.

9. A lens shading correction method comprising:
   extracting a position of a pixel;
   generating an elliptical gain value using the extracted position of the pixel and elliptical gain parameters;
   generating a first output value by multiplying the elliptical gain value by a weight for the pixel;
   generating a second output value by adding the first output value and a gain increment value together;
   generating a final output value by multiplying the second output value by an initial input value; and
   correcting lens shading based on the final output value.

10. The lens shading correction method of claim 9, wherein the generating of the elliptical gain value comprises generating different elliptical gain values according to the position of the pixel.

11. The lens shading correction method of claim 9, wherein, in the extracting of the position of the pixel, the pixel is located on a two-dimensional (2D) plane, and the position of the pixel comprises a first position value in a first direction and a second position value in a second direction orthogonal to the first direction.

12. The lens shading correction method of claim 11, wherein the generating of the elliptical gain value comprises generating the elliptical gain value using an nth degree equation, the elliptical gain parameters, and the position value of the pixel.

13. The lens shading correction method of claim 12, wherein, in the generating of the elliptical gain value using the elliptical gain parameters, the elliptical gain parameters comprise first to fourth parameters, the first parameter and the second parameter are parameters of the nth degree equation, the third parameter is an ellipse parameter in the first direction, and the fourth parameter is an ellipse parameter in the second direction.

14. An image processing system comprising an image sensor and an image signal processor,
   wherein the image signal processor comprises a register storing elliptical gain parameters and a lens shading correction circuit,
   wherein the lens shading correction circuit comprises:
      an elliptical gain generation circuit configured to extract a position of a pixel and generate an elliptical gain value using the elliptical gain parameters; and
      a first multiplier configured to output a first output value by multiplying the elliptical gain value by a weight for the pixel,
   wherein the weight for the pixel is determined based on characteristics of the image sensor, and wherein the lens shading circuit corrects lens shading using the first output value and a gain increment value.

15. The image processing system of claim 14, wherein the lens shading correction circuit further comprises:

an adder configured to output a second output value by adding the first output value and the gain increment value together; and a second multiplier configured to output a final output value by multiplying the second output value and an initial input value together, wherein the lens shading circuit corrects the lens shading using the final output value.

16. The image processing system of claim 14, wherein the elliptical gain generation circuit is further configured to generate different elliptical gain values according to the position of the pixel.

17. The image processing system of claim 16, wherein the pixel is located on a two-dimensional (2D) plane, and the position of the pixel comprises a first position value in a first direction and a second position value in a second direction orthogonal to the first direction.

18. The image processing system of claim 17, wherein the elliptical gain generation circuit is further configured to generate the elliptical gain value using an nth degree equation, the elliptical gain parameters, and the first and second position values of the pixel.

19. The image processing system of claim 18, wherein the elliptical gain parameters comprise first to fourth parameters, the first parameter and the second parameter are parameters of the nth degree equation, the third parameter is an ellipse parameter in the first direction, and the fourth parameter is an ellipse parameter in the second direction.

* * * * *